Sept. 6, 1955     K. F. McCANN     2,717,082
FILTER ELEMENT WITH END SEALING MEANS
Filed April 5, 1952

INVENTOR.
K. F. McCANN
BY
*C. M. McKnight*
ATTORNEY

# United States Patent Office 2,717,082
Patented Sept. 6, 1955

2,717,082

FILTER ELEMENT WITH END SEALING MEANS

Kelly F. McCann, Tulsa, Okla., assignor to Warner Lewis Company, Tulsa, Okla., a corporation of Delaware Application April 5, 1952, Serial No. 280,783

2 Claims. (Cl. 210—169)

This invention relates to improvements in filters.

The invention contemplates a filter shell having opposed inlets and outlets in the lower portion thereof with a manifold or gathering box supported in the shell directly between the inlets and outlets. The manifold communicates with the outlet and its top wall provides a filter holding plate for receiving a plurality of tubular shaped filter elements. The filter elements are supported vertically on the top of the manifold in the upper portion of the shell. Thus, fluid passing through the filter initially contacts the manifold to diffuse the fluid and separate the heavier contaminates therefrom. The fluid is then forced upwardly around the manifold along the inner periphery of the shell and flows radially into the filtering elements where the finer contaminating particles are removed from the fluid. The filtered fluid is gathered in the central portion of each filtering element and is then discharged downwardly into the manifold for subsequent discharge through the outlet. It will be apparent that since the filtering elements are disposed in the upper portion of the shell and since the heavier contaminating particles are removed in the lower portion of the shell, the larger contaminating particles will not collect on the outer surface of the filtering elements to impair the flow of fluid therethrough. The service life and efficiency of the surface type filtering elements will, therefore, be materially improved.

The invention also contemplates a novel locking device for securing the tubular shaped filtering elements to the filter holding plate. A plurality of apertured center tubes are secured to the filter holding plate for telescopically receiving the tubular shaped filter elements. The elements are retained on the center tubes by means of a spring loaded lock, and seals are provided at the opposite ends of the filter elements to preclude the fluid from bypassing the filtering medium of the elements. The locking device permits efficient and simple individual removal of the filter elements.

An important object of this invention is to provide a filtering device containing a diffusing means and a filtering means whereby fluid passing through the filter is initially diffused for separation of large contaminating particles and is subsequently filtered to remove the smaller contaminating particles.

Another object of this invention is to provide a filtering device having surface type filter elements therein, wherein the filtering elements are arranged in the upper portion of the device to minimize the deposition of large contaminating particles thereon.

A further object of this invention is to increase the service life and efficiency of surface type filtering elements.

Another object of this invention is to provide a novel means for supporting tubular filter elements on a filter holding plate, whereby the filter elements may be simply and efficiently individually detached from the filter holding plate.

A still further object of this invention is to provide means for securing two or more tubular shaped filter elements in end to end relation on a filter holding plate; and to secure the elements in such a manner to preclude the fluid being filtered from bypassing the filtering medium of the elements.

Other objects and advantages of the invention will be evident from the following detailed description, read in conjunction with the accompanying drawings, which illustrate my invention.

Figure 1:
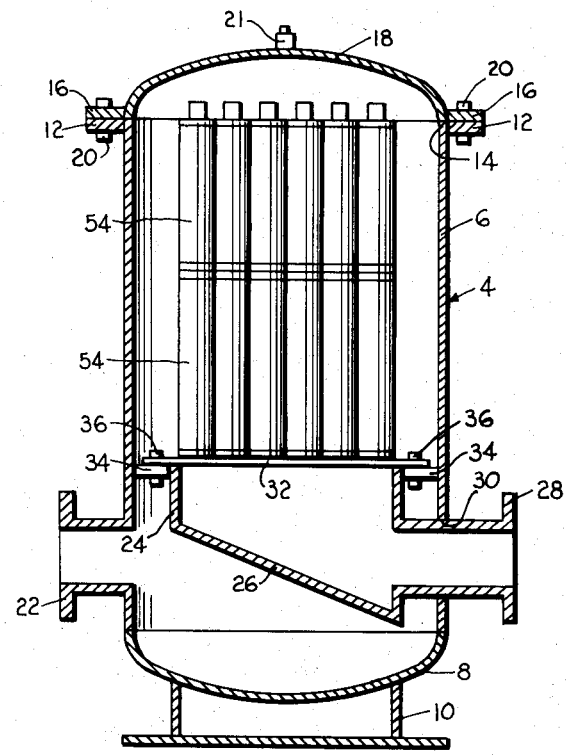
Figure 1 is a vertical sectional view of my novel filter with parts of the filter in elevation.

Referring to the drawings in detail, reference character 4 generally designates a novel filter device comprising a cylindrical shell 6 having its lower end 8 permanently closed. The shell 6 is preferably supported in a vertical position by a suitable support 10 as shown in Fig. 1. An outwardly extending circumferential flange 12 is provided on the upper open end 14 of the shell 6. The flange 12 is adapted to receive a mating flange 16 of a head portion 18. The flanges 12 and 16 are interconnected by circumferentially spaced bolts 20. A vent 21 is provided in the head portion 18 in the usual manner.

A flanged inlet 22 is provided in the lower portion of the shell 6 to direct contaminated fluid into the shell as will be hereinafter set forth. A cylindrically shaped manifold or gathering box 24, having an inclined bottom wall 26, is disposed in the shell 6 in a position opposite the inlet 22. A flanged outlet 28 communicates with one side of the manifold 24 and extends through an aperture 30 in the shell 6 diametrically opposite the inlet 22. It will be apparent that the flanged inlet 22 and the flanged outlet 28 are so arranged for convenient interposition of the filter 4 in a fluid flow line (not shown).

The top wall 32 of the manifold 24 is circular in configuration and extends outwardly from the manifold 24 to rest on a plurality of circumferentially spaced lugs or brackets 34. The brackets 34 are secured to the inner periphery of the shell 6 in any suitable manner, such as by welding (not shown). The top wall 32 of the manifold 24 is secured to the brackets 34 by bolts 36. As will be more fully hereinafter set forth, the element 32 functions not only as the top wall of the manifold 24, but also as a filter holding plate.

Figure 2:
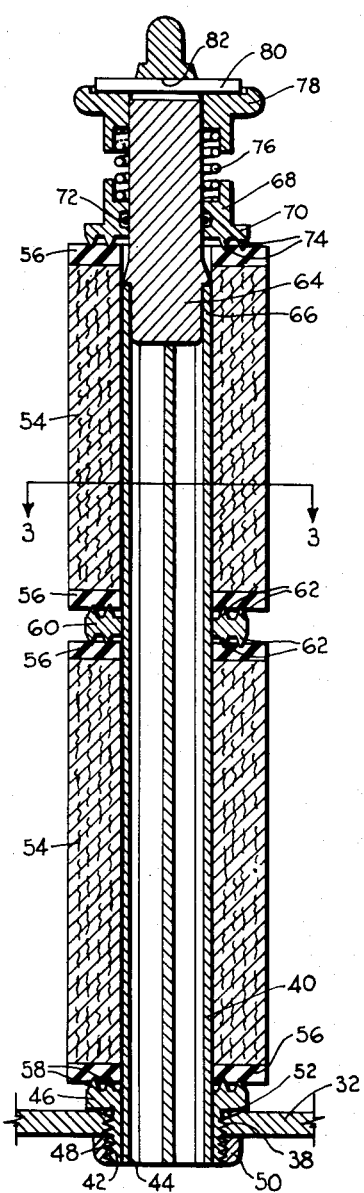
Figure 2 is a vertical sectional view of a pair of filter elements supported on a filter holding plate.
Figure 3:
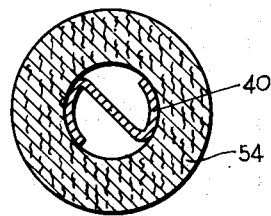
Figure 3 is a sectional view taken substantially along lines 3—3 of Fig. 2.

A plurality of spaced apertures 38 (only one of which is shown—see Fig. 2) are provided in the top wall 32 of the manifold 24 to receive a plurality of vertically disposed center tubes 40. The center tubes 40 may be either apertured tubular shaped elements (not shown), or substantially Z-shaped bars as shown in Fig. 3. A tubular shaped connecting member 42 is rigidly secured on the lower end 44 of each center tube 40. The connecting members 42 are of a size to be inserted in the respective apertures 38 and each connecting member is provided with an external flange 46 on the upper end thereof. External threads 48 are provided on the lower end of each connecting member 42 to receive nuts 50. It will be apparent that upon tightening of the nuts 50, the flanges 46 are drawn tightly down onto the upper surface of the plate 32 to rigidly secure the center tubes 40. The upper surface of the plate 32 is beveled around each of the apertures 38 to receive a suitable sealing ring 52, whereby each connecting member 42 is sealed in its respective aperture 38.

A pair of tubular shaped filter elements 54 are telescopically disposed on each of the center tubes 40 in end to end relationship. The elements 54 are preferably surface type filter elements and may be constructed of any suitable filtering material, such as fiber or cotton (as shown) or pleated paper and the like (not shown). An annular shaped gasket 56, preferably formed out of cork, is provided on each end of each filter element 54. The gaskets 56 are glued or otherwise secured to the ends of the elements 54 to prevent leakage of fluid between each of the gaskets and the respective end of the filter element.

A pair of concentric upwardly extending circumferential flanges 58 are provided on the upper end of each connecting member 42 to engage the respective gasket 56. The side walls of each flange 58 are tapered in order that the flanges will converge toward their upper or outer ends in a manner similar to a wedge. It will be readily seen, therefore, that the flanges 58 will, in effect, bite into the respective gasket 56 and prevent a flow of fluid inwardly between the lowermost gaskets 56 and the tubular members 42.

A ring 60 surrounds the center tube 40 between the filter elements 54 and has a pair of concentric circumferential flanges 62 on each end face thereof. The flanges 62 are formed in the same manner as the previously described flanges 58 to engage the adjacent gaskets 56 and prevent a flow of fluid between the elements 54 directly to the center tube 40.

A cylindrically shaped stud 64 is rigidly secured to the upper end 66 of each center tube 40. The studs 64 extend upwardly above the respective filter element 54 and each stud has a tubular shaped member 68 disposed thereon. Each member 68 is provided with an external flange 70 on the lower end thereof and is sealed to the respective stud 64 by a suitable sealing ring 72. A pair of concentric circumferential flanges 74 are provided on the lower end of each member 68. The flanges 74 are formed in the same manner as the previously described flanges 58 and 62 to engage the adjacent gasket 56 and prevent a flow of fluid between the member 68 and the gaskets 56 directly to the center tube 40. A helical spring 76 surrounds each stud 64 and is anchored at its lower end to the respective member 68. The upper end of each spring 76 is anchored to a tubular shaped locking member 78 also disposed on the stud 64. A locking pin 80 extends through a transverse aperture 82 at the upper end of each stud 64 to engage the respective locking member 78 and prevent upward movement thereof. It will be apparent, therefore, that the spring 76 reacts on the respective locking member 78 to retain the member 68 in a down position in order that the flanges 74 will engage the respective gaskets 56.

*Operation*

In operation of the filter device 4, the contaminated fluid, such as liquid fuel, is injected into the shell 6 through the inlet 22. It will be apparent that as the fluid enters the shell 6, it will contact the adjacent side wall and the inclined bottom wall 26 of the manifold 24; whereupon, the fluid will be diffused to change the direction of flow of the fluid and facilitate the removal of the larger and heavier contaminating particles therefrom. After contacting the manifold 24, the fluid is forced upwardly along the inner periphery of the shell 6 between the supporting lugs 34 into the upper portion of the shell. Subsequently, the fluid flows radially inward into the filter elements 54, where the finer or smaller contaminating particles are filtered out of the fluid. It will be noted that the flanges 58, 62 and 74, in cooperation with the gaskets 56, preclude the fluid from bypassing the filtering medium of the elements 54 and flowing directly into the center of the elements 54. The fluid is gathered in the center tube 40 of each pair of filter elements 54 where it is discharged downwardly through the top wall 32 into the manifold 24 for subsequent discharge through the outlet 28.

It should also be noted that when the incoming fluid is disbursed by the side and bottom wall 26 of the manifold 24, air which may be entrained in the fluid is effectively removed. The separated air will immediately flow upwardly around the filter elements 54 into the head 18, where it may be removed by a simple air eliminator (not shown), as is well known in the art.

After an extended period of service, the filter elements 54 will become saturated with contaminating particles to impede the flow of fluid therethrough. When this condition occurs, the flow of fluid through the filter 4 is stopped and the head portion 18 thereof is removed. Each of the locking devices 78 is then individually forced downward a short distance to permit removal of the locking pins 80. The locking members 78 and the member 68, along with the springs 76, may then be removed from the respective studs 64 to permit replacement of the filter elements 54. When clean filter elements 54 have been placed on each of the center tubes 40, the locking devices 78, members 68, springs 76 and pins 80 may be re-installed in the positions shown in Fig. 2. The head portion 18 may then be placed on the shell 6 and the filter 4 again placed in operation.

From the foregoing, it is apparent that the present invention provides a filtering device containing both a diffusing means and a filtering means, whereby fluid passing through the filter is initially diffused for separation of large contaminating particles and is subsequently filtered to remove the smaller contaminating particles. The filtering means are arranged in the upper portion of the filtering device above the level where the separation of large contaminating particles occurs, therefore, the larger contaminating particles will not come in contact with the filtering means to unnecessarily reduce the service life of the filters. It will also be apparent that the present invention provides a novel means for securing two or more tubular filter elements in end to end relationship on a filter holding plate in such a manner that the filter elements may be easily and conveniently individually replaced.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A locking device for securing a tubular shaped filter element to a filter holding plate having an aperture therein, comprising a center tube of a size to telescopically receive the element, an externally threaded tubular member secured to one end of the tube, said member being of a size to be inserted in the plate aperture, a nut for securing said member in said aperture, annular gaskets on the opposite ends of the element, a plurality of concentric circumferential flanges on said member to engage one of said gaskets and seal the respective end of the element to the filter holding plate, a stud secured in the opposite end of the tube, a sealing ring slidable on the stud, a plurality of concentric circumferential flanges on the sealing ring to engage the remaining gasket and seal the respective end of the element to the stud, a helical spring surrounding the stud, and means carried by the stud for retaining one end of the helical spring in contact with the sealing ring.

2. A locking device for securing a pair of tubular shaped filter elements in end to end relation to a filter holding plate having an aperture therein, comprising a center tube of a size to telescopically receive the elements in end to end relation, annular shaped gaskets on each end of each element, a tubular member secured to one end of the center tube and having external threads on one end thereof, said member being of a size to be inserted in said aperture, a nut for engaging said threads and securing the member in said aperture, a plurality of concentric circumferential flanges on the opposite end of the member to engage one of said gaskets and seal the respective end of the respective element to the holding plate, a ring on the tube between the adjacent ends of the elements, concentric circumferential flanges extending from the opposite end faces of said ring to engage the adjacent gaskets and seal the adjacent end of the elements to one another, a stud secured to the opposite end of the center tube, a seal slidable on the stud, a circumferential flange on one end face of the seal to engage the gasket on the respective end of the element remote from the holding plate, whereby the respective end of the remote element will be sealed to the stud, a helical spring surrounding the stud, and means on the stud for retaining one end of the spring in contact with the seal, whereby the last mentioned circumferential flange will be retained in engagement with the respective gasket.

References Cited in the file of this patent

UNITED STATES PATENTS

| Number | Name | Date |
|---|---|---|
| 1,882,078 | Hennings | Oct. 11, 1932 |
| 2,173,978 | Pennebaker | Sept. 26, 1939 |
| 2,376,739 | Walker | May 22, 1945 |
| 2,439,936 | Kasten | Apr. 20, 1948 |
| 2,440,487 | Rayburn | Apr. 27, 1948 |
| 2,454,030 | Besore | Nov. 16, 1948 |
| 2,487,146 | Lasky | Nov. 8, 1949 |
| 2,521,060 | Hallinan | Sept. 5, 1950 |
| 2,545,374 | Nugent | Mar. 13, 1951 |
| 2,548,400 | Shepard | Apr. 10, 1951 |
| 2,584,387 | Harvuot | Feb. 5, 1952 |
| 2,584,394 | Marvel | Feb. 5, 1952 |

FOREIGN PATENTS

| Number | Country | Date |
|---|---|---|
| 641,366 | France | Aug. 2, 1928 |
| 751,730 | France | Sept. 8, 1933 |